(12) United States Patent
Smith

(10) Patent No.: US 9,252,577 B1
(45) Date of Patent: Feb. 2, 2016

(54) ELECTRICAL TRANSITION FITTING

(71) Applicant: Bridgeport Fittings, Inc., Stratford, CT (US)

(72) Inventor: Lawrence J. Smith, Stamford, CT (US)

(73) Assignee: BRIDGEPORT FITTINGS, INC., Stratford, CT (US)

( * ) Notice: Subject to any disclaimer, the term of this patent is extended or adjusted under 35 U.S.C. 154(b) by 0 days.

(21) Appl. No.: 14/522,643

(22) Filed: Oct. 24, 2014

(51) Int. Cl.
*H02G 3/18* (2006.01)
*H02G 3/06* (2006.01)
*H02G 15/076* (2006.01)

(52) U.S. Cl.
CPC ........... *H02G 3/0666* (2013.01); *H02G 15/076* (2013.01)

(58) Field of Classification Search
CPC ..... H02G 3/06; H02G 3/0616; H02G 3/0666; H02G 3/0691; H02G 3/0658; H02G 15/00; H02G 15/007; H02G 15/04; H02G 15/076
USPC ................. 174/660, 665, 653, 659, 668, 135, 174/152 G, 153 G, 151, 650, 59, 60, 61, 657, 174/666, 84 R, 88 R, 656; 248/56, 49, 68.1; 285/149.1, 154.1; 439/552, 709, 724, 439/798, 810, 811, 814, 142, 319, 544, 557
See application file for complete search history.

(56) References Cited

U.S. PATENT DOCUMENTS

| | | | |
|---|---|---|---|
| 2,195,933 | A | 4/1940 | Marlborough et al. |
| D187,594 | S | 4/1960 | Stover |
| D187,792 | S | 5/1960 | Stover |
| 2,962,542 | A | 11/1960 | Witt |
| 3,187,088 | A | 6/1965 | Warner |
| 3,411,163 | A | 11/1968 | Myers |
| 4,723,054 | A | 2/1988 | Billet |
| 4,899,401 | A | 2/1990 | Savarese |
| 5,055,064 | A | 10/1991 | Imaizumi et al. |
| 5,288,947 | A | 2/1994 | Stewing |

(Continued)

FOREIGN PATENT DOCUMENTS

| | | |
|---|---|---|
| JP | 5196960 B2 | 5/2013 |
| WO | 03/094321 A1 | 11/2003 |

OTHER PUBLICATIONS

"MC4 Y Connectors;" www.ebay.com; http://www.ebay.com/bhp/mc4-y-connectors; Apr. 21, 2014; pp. 1-13.

(Continued)

*Primary Examiner* — Angel R Estrada
(74) *Attorney, Agent, or Firm* — Ware, Fressola, Maguire & Barber LLP

(57) ABSTRACT

An electrical transition fitting for enabling electrical wires contained in multiple cables to be extended through an electrical conduit, or into a panel box. The fitting has a lower body member having a first member dimensioned for receipt of an electrical conduit or passage through a knockout hole of a panel box, and a second member with a slot at a second end, an upper body member having at least three bores formed therein, the bores for receipt of the cables, the upper body member having a plate at a first end, the plate dimensioned for contact with a perimeter of the second member and having a tab for receipt in the slot, and a hole for receipt of a fastener to secure the upper body member to the lower body member and plastic insulators and inner locking devices for installation in the bores.

14 Claims, 19 Drawing Sheets

(56) References Cited

U.S. PATENT DOCUMENTS

| | | | |
|---|---|---|---|
| 5,532,436 A | 7/1996 | Moyers et al. | |
| 5,714,715 A | 2/1998 | Sundhararajan et al. | |
| 5,920,035 A | 7/1999 | Haney et al. | |
| 5,941,718 A | 8/1999 | Didier | |
| 6,045,403 A | 4/2000 | Werner et al. | |
| 6,194,661 B1 * | 2/2001 | Gretz | H01R 13/745 174/650 |
| 6,355,884 B1 | 3/2002 | Gretz | |
| 6,409,179 B1 | 6/2002 | Daoud | |
| 6,521,831 B1 | 2/2003 | Gretz | |
| 7,075,007 B2 | 7/2006 | Auray et al. | |
| 7,115,822 B1 | 10/2006 | Day et al. | |
| 7,151,223 B2 | 12/2006 | Auray et al. | |
| 7,304,251 B1 * | 12/2007 | Gretz | H02G 3/0691 174/653 |
| 7,329,144 B1 | 2/2008 | Gretz | |
| 7,402,752 B1 | 7/2008 | Kiely | |
| D581,877 S | 12/2008 | Kiely | |
| 7,521,634 B2 | 4/2009 | Clem et al. | |
| D600,649 S | 9/2009 | Smith | |
| D600,650 S | 9/2009 | Smith | |
| 7,582,831 B2 | 9/2009 | Kiely et al. | |
| 7,723,623 B2 | 5/2010 | Kiely et al. | |
| 7,931,619 B2 | 4/2011 | Diamond et al. | |
| 7,952,034 B2 * | 5/2011 | Kiely | H02G 3/0691 174/650 |
| 7,973,241 B2 | 7/2011 | Evoniuk et al. | |
| 8,119,933 B2 | 2/2012 | Auray et al. | |
| 8,124,891 B1 | 2/2012 | Gretz | |
| 8,242,369 B2 | 8/2012 | Kiely et al. | |
| 8,350,163 B2 * | 1/2013 | Auray | H02G 3/0691 174/650 |
| 8,456,036 B2 | 6/2013 | Kotlyar et al. | |
| 8,513,543 B1 | 8/2013 | Lin | |
| D699,195 S | 2/2014 | Smith | |
| 2012/0292100 A1 | 11/2012 | Thomas | |
| 2013/0171881 A1 | 7/2013 | Golen | |
| 2015/0280411 A1 | 10/2015 | Plathe | |

OTHER PUBLICATIONS

"DVI to 2 Dual Female Monitor Splitter Cable;" www.ebay.com; http://www.ebay.com/itm/New-DVI-I-24-5-Pins-Male-to-2-Dual-VGA-Female-Monitor-Adapter-Splitter-Cable-/221264470024; Apr. 21, 2014; pp. 1-5.

"DB-02 Y adapter two in one for Godox PROPAC;" ebay.com; http://www.ebay.com/itm/Godox-DB-02-two-in-one-cable-Y-adapter-for-PROPAC-Power-Pack-PB960-Accessory-/350848175405; Apr. 21, 2014; pp. 1-4.

"XT60 to 4 bullet Multistar ESC Power Breakout Cable;" www.hobbyking.com; http://www.hobbyking.com/hobbyking/store/_25480_xt60_to_4_x_3_5mm_bullet_multistar_esc_power_breakout_cable.html; pp. 1-5.

* cited by examiner

ELECTRICAL TRANSITION FITTING

TECHNICAL FIELD

The present invention is directed to an electrical transition fitting for enabling electrical wires contained in more than two metal clad or armored clad cables to be combined and passed through an electrical conduit or into to an electrical panel box or the like.

BACKGROUND OF THE INVENTION

The present invention is directed to an electrical transition fitting that can be used in residential, commercial and industrial applications. As disclosed in applicant's U.S. Pat. No. 7,402,752, various electrical conduits, such as electrical metallic tubing (EMT) and cables, such as metal clad (MC) or armored clad (AC), which contain electrical wires with insulated conductors must be interconnected, for example, to a primary power supply in a suitable power distribution outlet box, junction box, panel box or other enclosure where metal clad or armored clad cable is used.

In some applications, it is desirable to allow passage of electrical wires from multiple metal clad or armored clad cables to a single electrical conduit where the conduit may then be connected to an electrical panel box or the like or for other purposes. In other applications, it is desirable to combine the electrical wires of multiple MC or AC cables for passage into a panel box directly through a single knockout hole in the panel box or the like.

There have been many duplex electrical connectors and electrical transition couplings for allowing two AC or MC cables to be combined in a single fitting to allow the electrical wires to pass either into a single electrical conduit (such as an EMT) or to pass into a panel box or the like through a single knockout hole in the panel box.

Although some electrical transition fittings have provided for more than two cables to be combined to allow wires to pass out of a single end thereof, none are believed to combine the features as disclosed in the present application which provide for easy and secure attachment of multiple MC or AC cables for combining and passing the electrical wires thereof through an electrical conduit or into a panel box or the like.

SUMMARY OF THE INVENTION

The present invention relates to an electrical transition fitting for enabling electrical wires contained in N metal clad or armored clad cables to be combined and extended through an electrical conduit or into an electrical panel box or the like, comprising a lower body member having a first member with an open first end dimensioned for receipt of an electrical conduit or for passage through a knockout hole in a panel box or the like, and a second member integrally connected at a first open end to an open second end of the first member, said second member having an open second end with a perimeter greater than a perimeter of the first open end of the second member, the open second end also having at least one slot formed therein, an upper body member having an extended region with N bores formed therein, the bores for receipt of a metal clad or armored clad cable, the upper body member having a plate at a first end, the plate dimensioned for contact with the perimeter of the second open end of the second member of the lower body member, the plate having openings formed therein at least in partial alignment with the bores, the plate including a hole formed therein, the hole for receipt of a fastener so as to secure and electrically bond the upper body member to the open second end of the lower body member, the plate also having at least one tab dimensioned for receipt in the at least one slot of the second end of the second member, N plastic insulators each dimensioned for snap in installation in one of the N bores at the first end of the upper body member, and N inner locking devices each dimensioned for press-in installation in one of the N bores at a second end of the upper body member and further configured to capture a metal clad or armored clad cable, where N is an integer greater than two.

Another embodiment of the present invention is the electrical transition fitting as described above, wherein the second member of the lower body member has a region that forms a flat surface so as to facilitate installation of the electrical transition fitting adjacent a flat surface.

Another embodiment of the present invention is the electrical transition fitting as described above, wherein the at least one slot is formed in a rim segment on the second end of the second member of the lower body member.

A further embodiment of the present invention is the electrical transition fitting as described above, wherein the at least one slot is formed in a rim segment on the second end of the second member of the lower body member.

A still further embodiment of the present invention is the electrical transition fitting as described above, wherein the first member of the lower body member includes a threaded bore passing therethrough dimensioned for receipt of a fastener so as to secure an electrical conduit to said first member.

Another embodiment of the present invention is the electrical transition fitting as described above, wherein the first member of the lower body member has an inner rim that acts as a stop to an electrical conduit positioned within the first member.

Another embodiment of the present invention is the electrical transition fitting as described above, wherein each inner locking device comprises a pair of arms extending inwardly from an inner surface of the inner locking device, the arms configured to secure and electrically bond to an outer surface of a metal clad or armored clad cable.

A further embodiment of the present invention is the electrical transition fitting as described above, wherein the second member of the lower body member has a generally frusto-conical shape.

A further embodiment of the present invention is the electrical transition fitting as described above, wherein N=3.

A still further embodiment of the present invention is the electrical transition fitting as described above, wherein the second member of the lower body member has a region that forms a flat surface so as to facilitate installation of the electrical transition fitting adjacent a flat surface.

Another embodiment of the present invention is the electrical transition fitting as described above, wherein the plate of the upper body member has N openings with inwardly extending rims each rim positioned about one of the N bores and wherein each plastic insulator has a radially extending rim at one end and radially projecting flexible fingers so as to capture the insulator between said radially extending rim, one of the N inwardly extending rims, and said radially projecting fingers.

Another embodiment of the present invention is the electrical transition fitting as described above, wherein the first member of the lower body member includes threads positioned on the outer surface thereof to secure installation of the electrical transition fitting through a knockout hole of an electrical panel box or the like by securement of a locknut thereto.

A further embodiment of the present invention is the electrical transition fitting as described above, wherein each of the N plastic insulators has an inner end that acts as a stop to a metal clad or armored clad cable when inserted into a bore of the electrical transition fitting.

A still further embodiment of the present invention is the electrical transition fitting as described above, wherein the first member of the lower body member has an inner rim that acts as a stop to an electrical conduit positioned within the first member.

BRIEF DESCRIPTION OF THE DRAWINGS

For a fuller understanding of the nature and objects of the present invention, reference should be made to the following detailed description taken in conjunction with the accompanying drawings in which:

FIG. 21 is a perspective view of another embodiment of an electrical transition fitting similar to that shown in FIG. 1 except that the lower body member has a threaded portion configured for mating with a locknut for attachment of the electrical fitting to a knockout hole in an electrical panel box and the like.

FIG. 27 is a perspective view of another embodiment of an electrical transition fitting similar to FIG. 23, except that the lower body member has a threaded portion configured for mating with a locknut for attachment of the electrical fitting to a knockout hole in an electrical panel box and the like.

DETAILED DESCRIPTION

Figure 1:
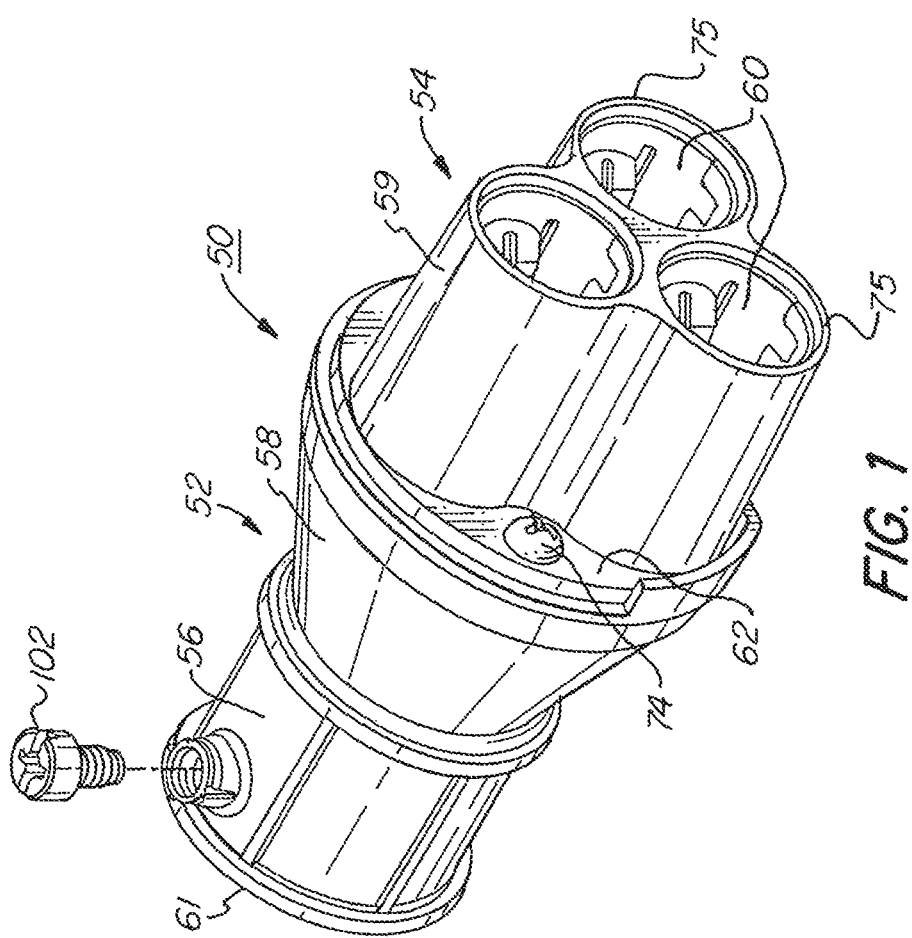
FIG. 1 is a perspective view of an electrical transition fitting according to the present invention for enabling electrical wires contained in N metal clad or armored clad cables to be combined and passed through an electrical conduit.

As best seen in FIG. 1, an electrical transition fitting 50 according to an embodiment of the present invention has a lower body member 52 and an upper body member 54 which are configured for attachment to each other. The lower body portion includes in this embodiment a first member 56 and a second member 58 connected to the first member 56. The first member has an open first end 61 dimensioned for receipt of an electrical conduit 104 (see FIGS. 1 and 15).

The upper body member has an extended region 59 having three bores 60 formed therein, as well as a plate 62 at a first end 71 for attachment of the upper body member to the lower body member. The plate has opening 73 formed therein at least in partial alignment with bores 60 formed in extended region 59 of the upper body member so as to allow electrical wires in the bores to pass through the plate. As seen in FIGS. 1, 4, 6-8 and 10, plate 62 includes at least one tab 64 configured for insertion within a corresponding slot 66 formed in an open second end 68 of the second member 58. Each slot can be formed in a rim segment 67 of second end 68 of second member 58. In this way, upper body member 54 can be easily positioned on lower body member 52 by sliding tabs 64 in slots 66. The slot and tab configuration assist in alignment of the upper body member to the lower body member.

Figure 10:
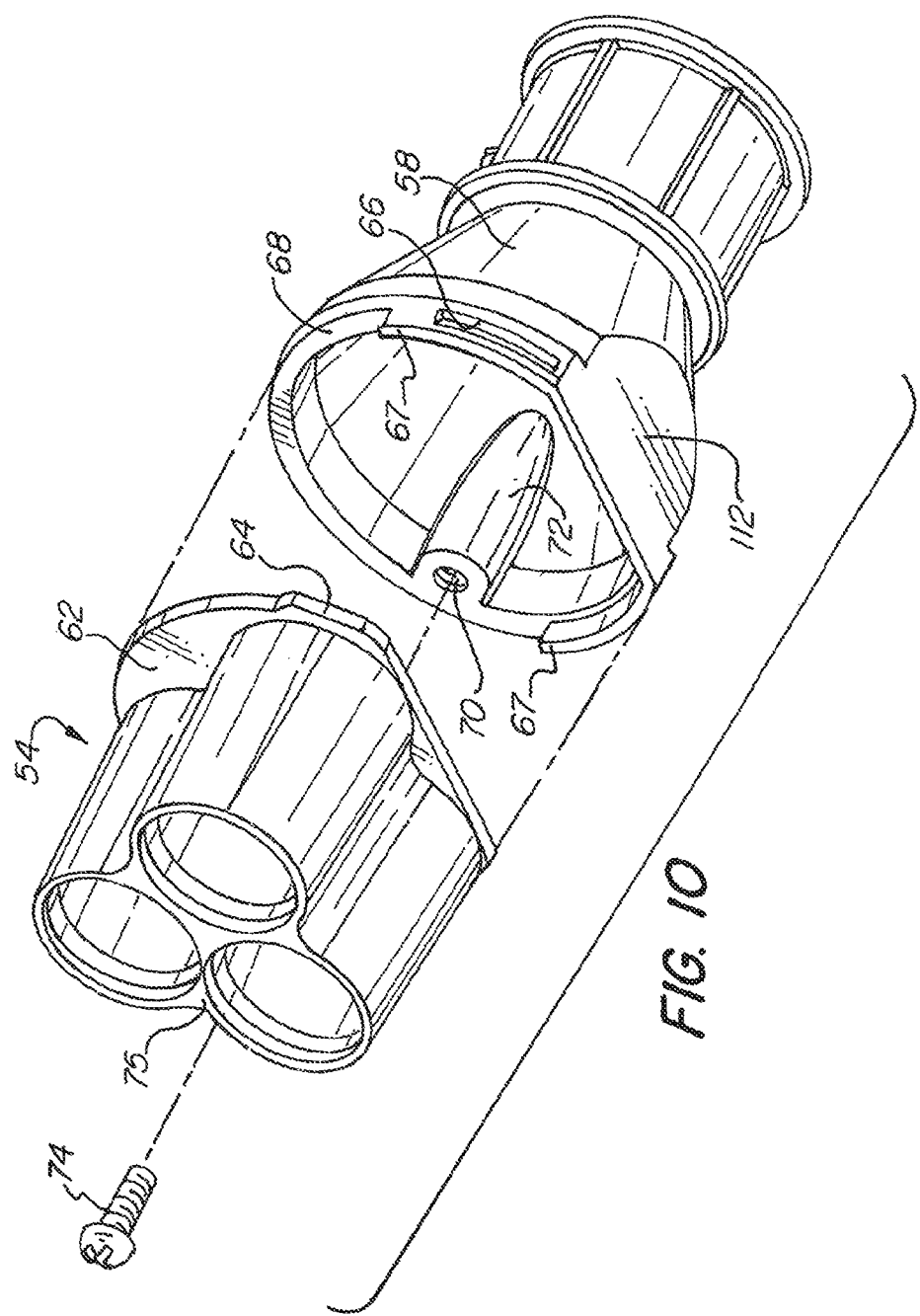
FIG. 10 is an exploded view of the electrical transition fitting shown in FIG. 9.

Also located at the open second end 68 of second member 58 is a threaded bore 70 formed in a boss 72 of the second member. As seen in FIG. 10, this boss may be finger-like in shape. Fastener 74 passes through a hole 76 in plate 62 as best seen in FIG. 10. The fastener provides not only securement of the lower body member to the upper body member, but also provides for electrical bonding of the two members to each other.

Figure 2:
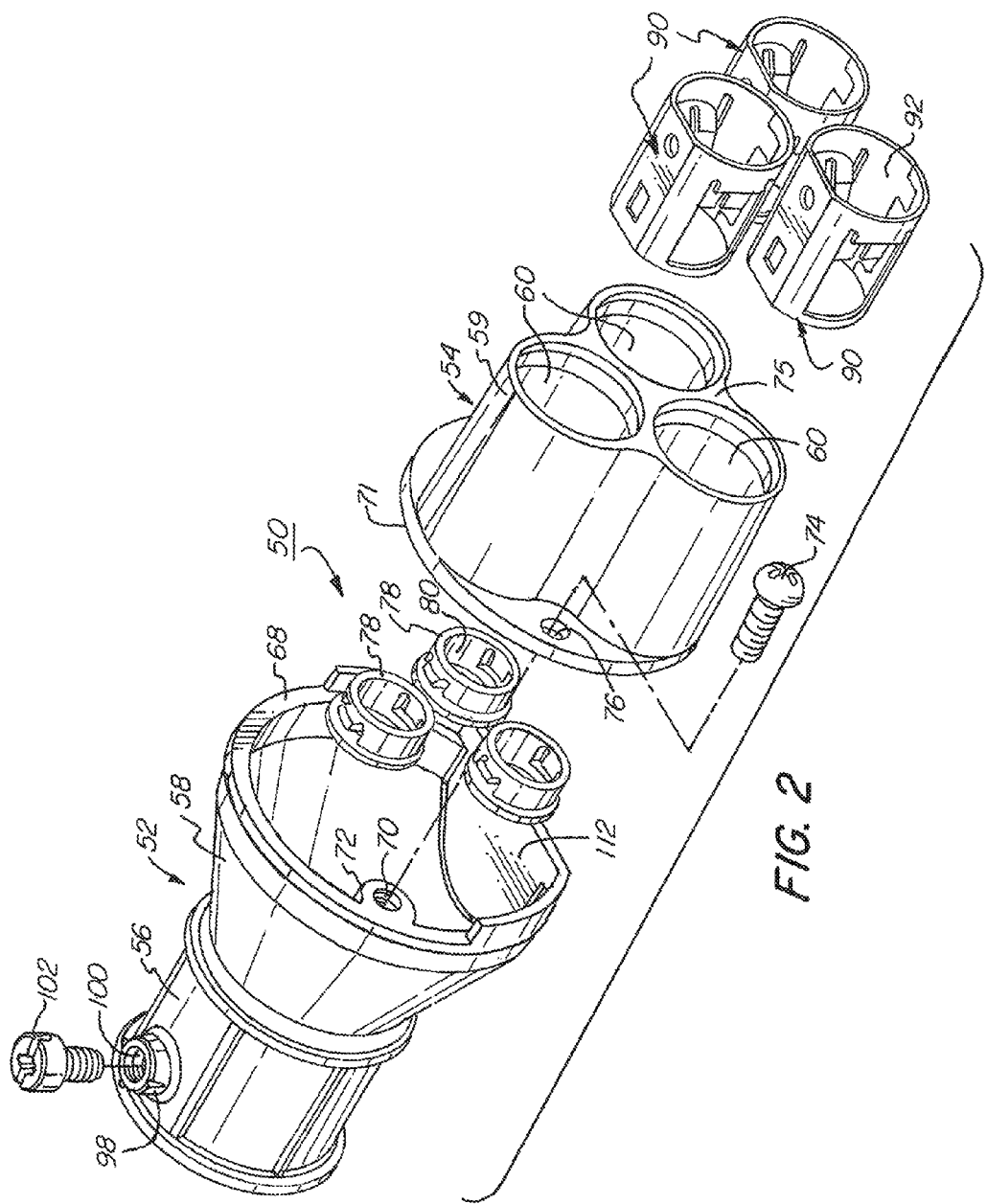
FIG. 2 is an exploded perspective view of the transition fitting as shown in FIG. 1.
Figure 3:
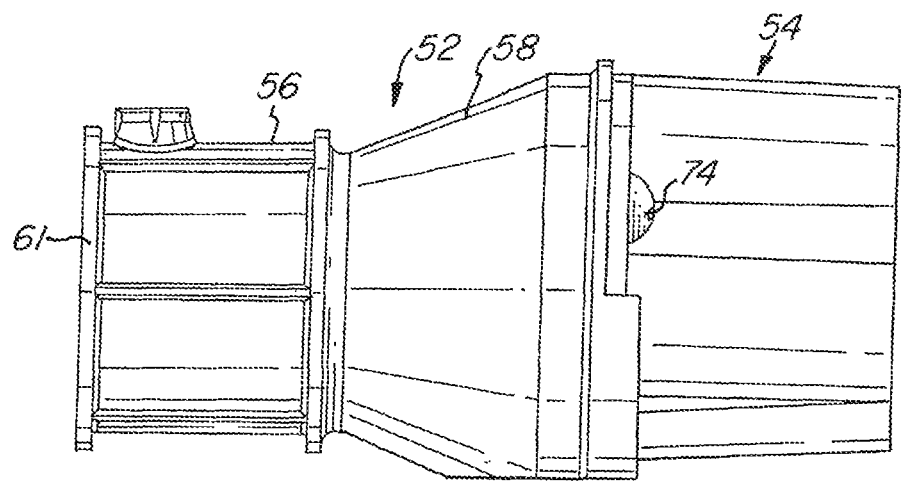
FIG. 3 is a right side view of the electrical transition fitting as shown in FIG. 1.
Figure 4:
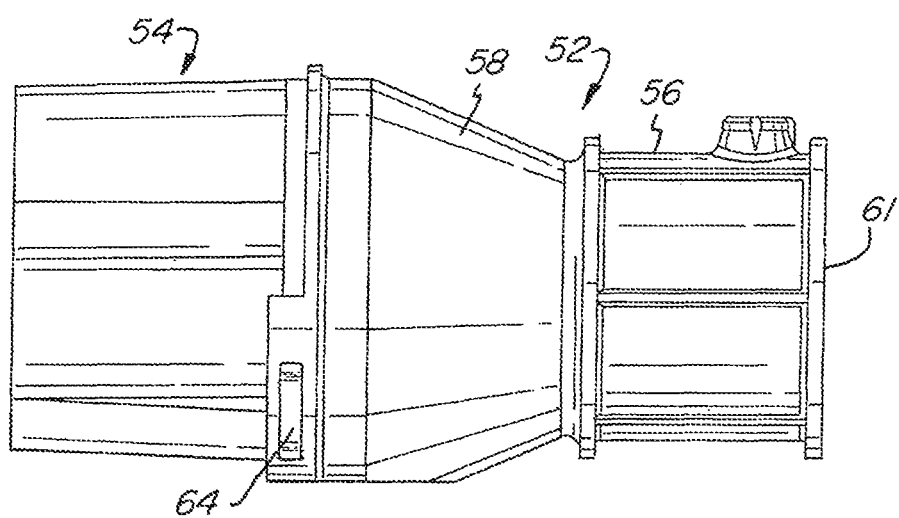
FIG. 4 is a left side view of the electrical transition fitting as shown in FIG. 1.
Figure 5:
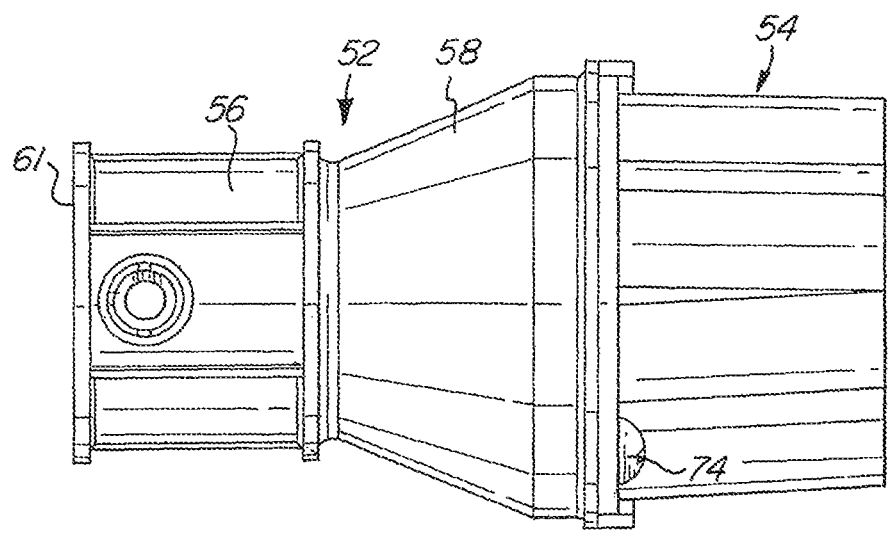
FIG. 5 is a top view of the electrical transition fitting as shown in FIG. 1.
Figure 6:
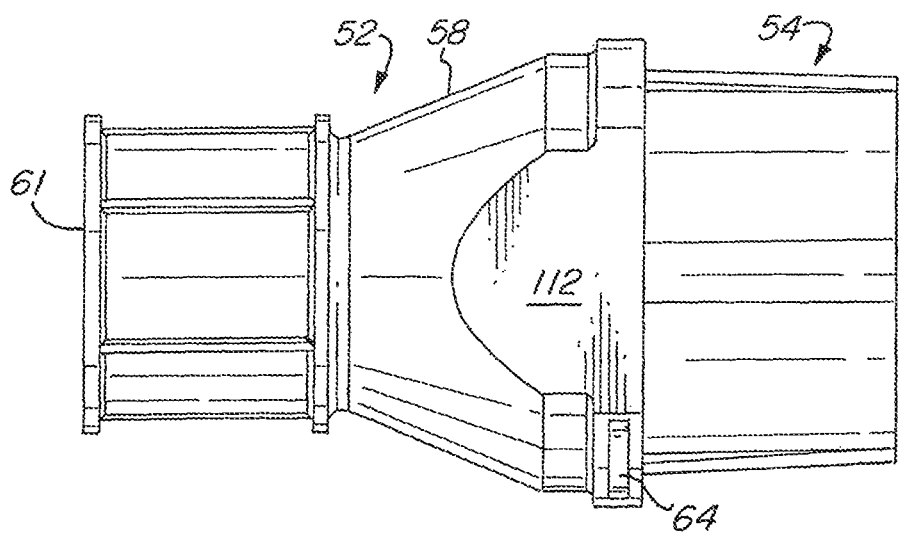
FIG. 6 is a bottom view of the electrical transition fitting as shown in FIG. 1.
Figure 7:
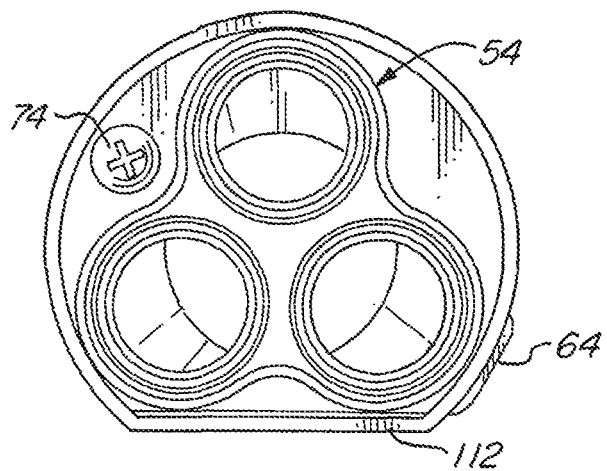
FIG. 7 is a front view of the electrical transition fitting as shown in FIG. 1.
Figure 8:
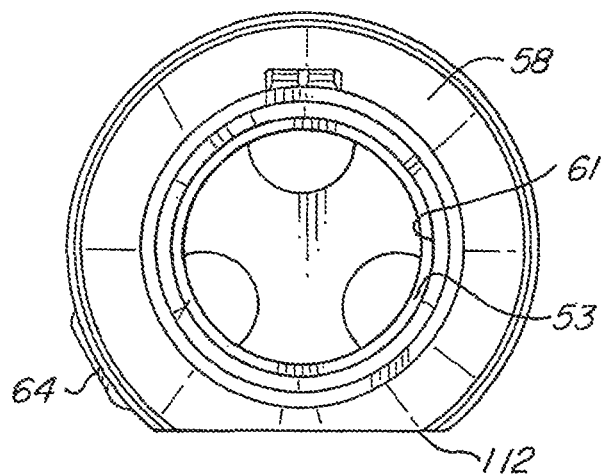
FIG. 8 is a rear view of the electrical transition fitting as shown in FIG. 1.
Figure 9:
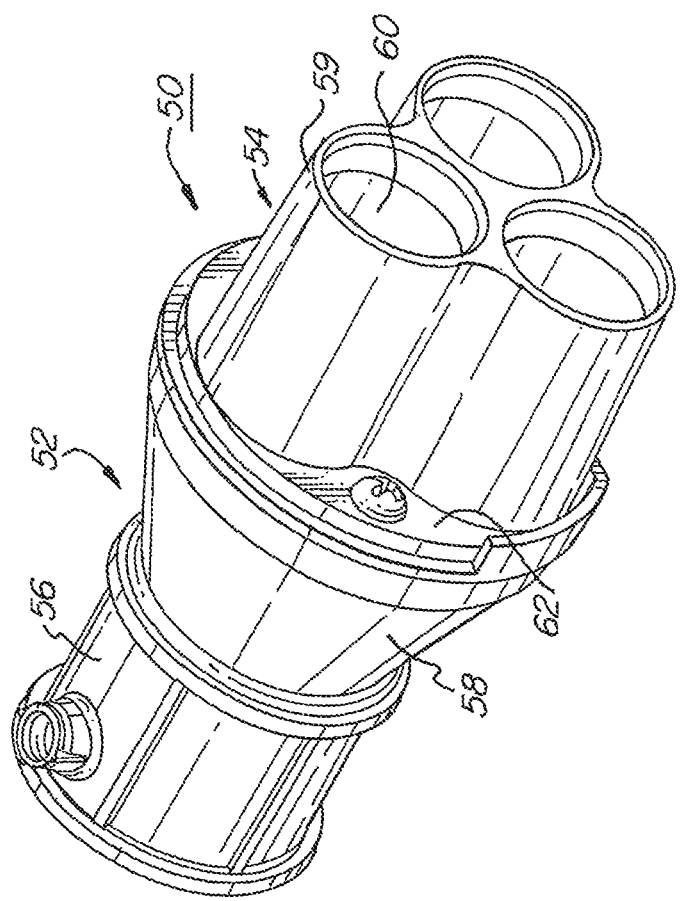
FIG. 9 is a perspective view of the electrical transition fitting as shown in FIG. 1 without the plastic insulators and inner locking devices installed.
Figure 19:
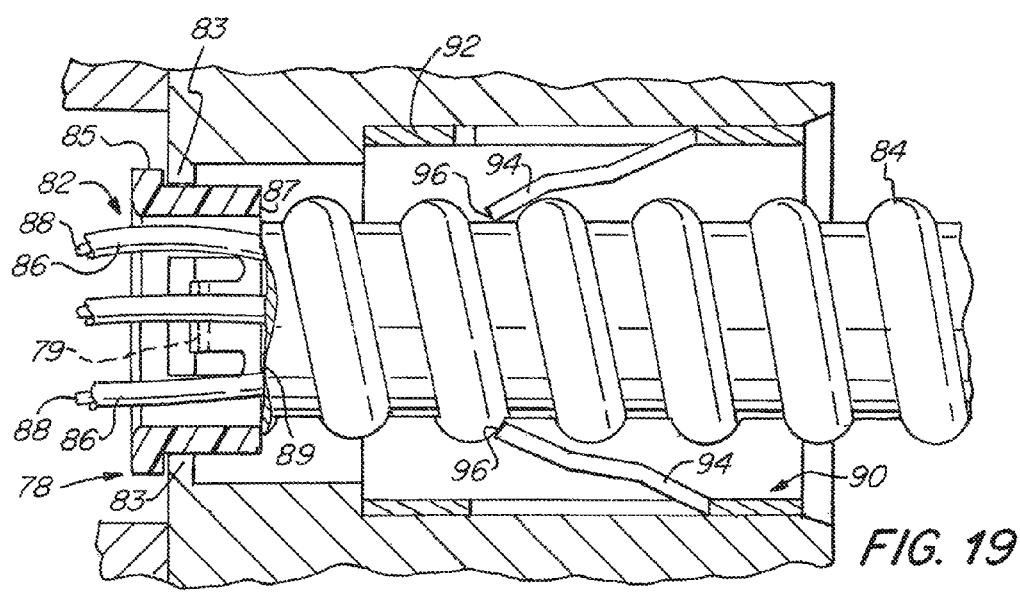
FIG. 19 is an enlarged cross-sectional view through one of the bores of the electrical transition fitting as shown in FIG. 1, illustrating a metal clad or armored clad cable inserted therein with the electrical wires thereof passing through a plastic insulator.

As best seen in FIG. 2, the electrical transition fitting 50 also includes plastic insulators 78 each for snap-in insertion in one of the bores 60. The plastic inserts are preferably fabricated from nylon and provide a passageway 80 for the passage of insulated electrical wires 82 emanating from a metal clad or armored clad cable 84 as best seen in FIG. 19.

Figure 13:
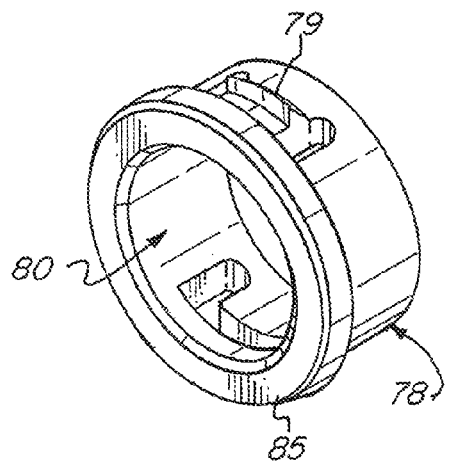
FIG. 13 is a perspective view of a plastic insulator as shown in FIG. 1.
Figure 14:
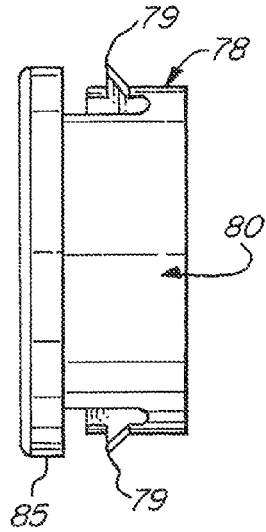
FIG. 14 is a side view of the plastic insulator as shown in FIGS. 1 and 13.

The passageway thereby facilitates the prevention of chaffing of the insulation 86 formed around conductors 88 of each electrical wire 82. As seen in FIGS. 13, 14 and 19 each plastic insulator includes projections 79 that are finger-like and depressible so as to snap into bore 60 so as to secure the insulation between rim 83 of extended region 59 and flange 85 formed on an end of insulator 78. Each plastic insulator has an inner end 87 opposite flange 85 that can act as a physical stop to an end 89 of MC/AC cable 84.

Figure 11:
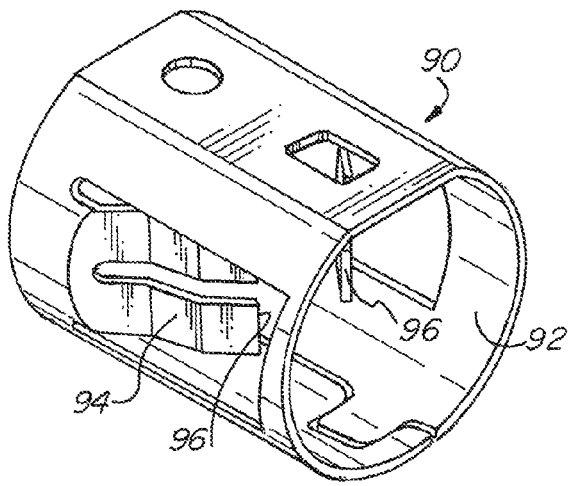
FIG. 11 is a perspective view of an inner locking device as shown in FIG. 1.
Figure 12:
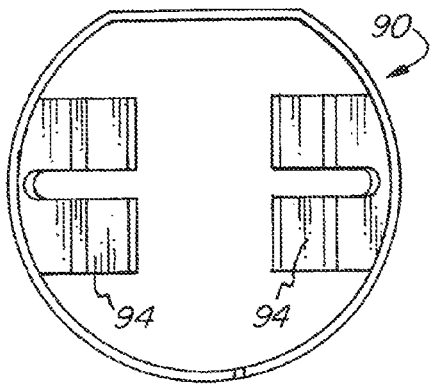
FIG. 12 is a front view of the inner locking device as shown in FIGS. 1 and 11.

A plurality of inner locking devices 90 are each positioned through an open second end 75 of upper body member 54 in one of the bores 60 as also seen in FIG. 1. Details of the locking devices are shown in FIGS. 11 and 12 and are fully disclosed in U.S. Pat. No. 6,444,907 owned by the present applicant. This patent is hereby incorporated by reference. Each locking device includes a snap-in member 92 which is resiliently flexible so as to form a secure press fit when inserted into a bore 60 as best seen in FIG. 19. The locking device also includes a pair of arms 94 having terminating ends 96 configured to retain a metal clad or armored clad cable 84 as seen in FIG. 19. Shoulders 91 in bores 60 act as stops for inner locking devices 90.

Figure 15:
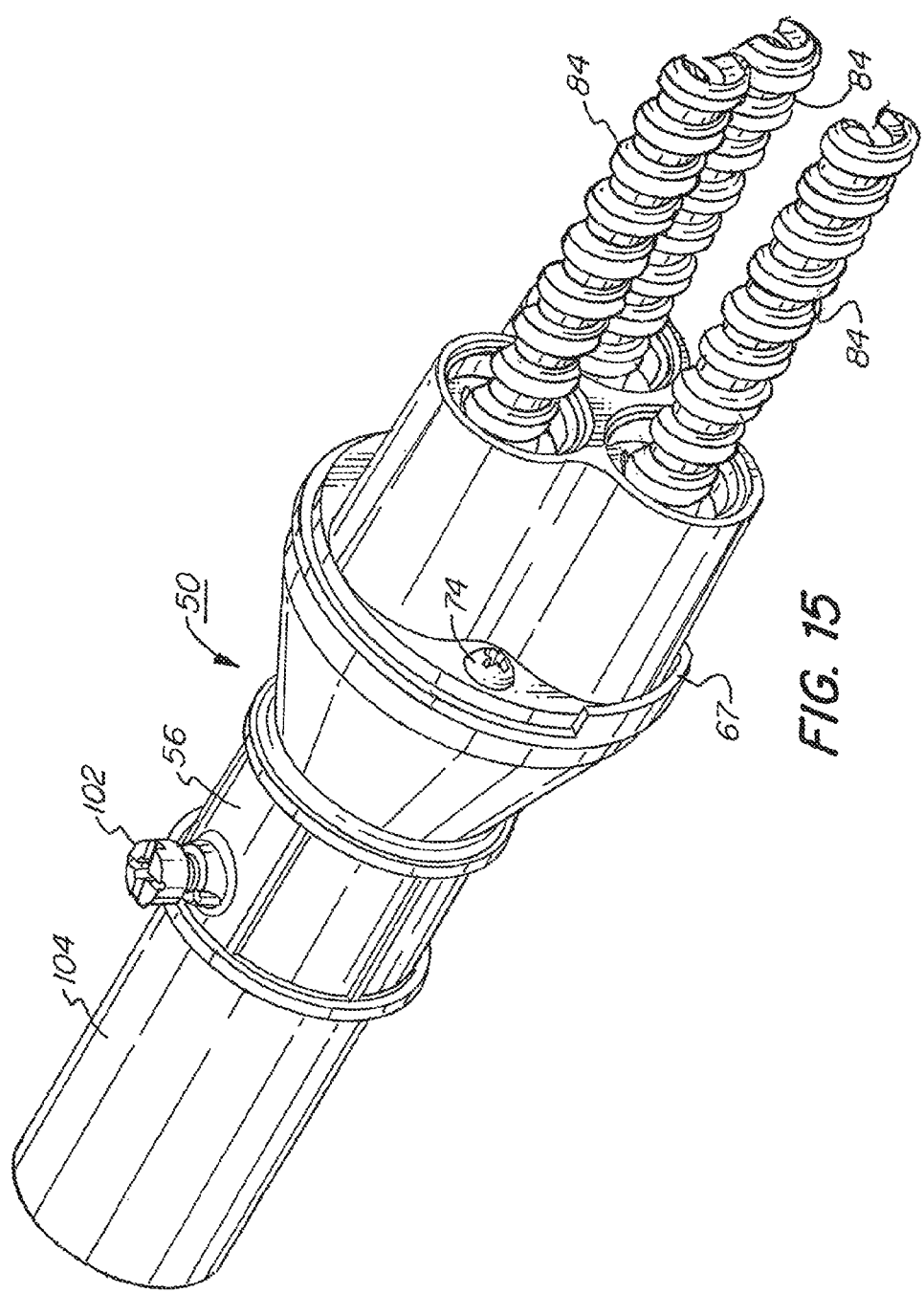
FIG. 15 is a perspective view of the electrical transition fitting as shown in FIG. 1 illustrating connection of three metal clad or armored clad cables at one end thereof and an electrical conduit, such as an EMT, at another end thereof.
Figure 16:
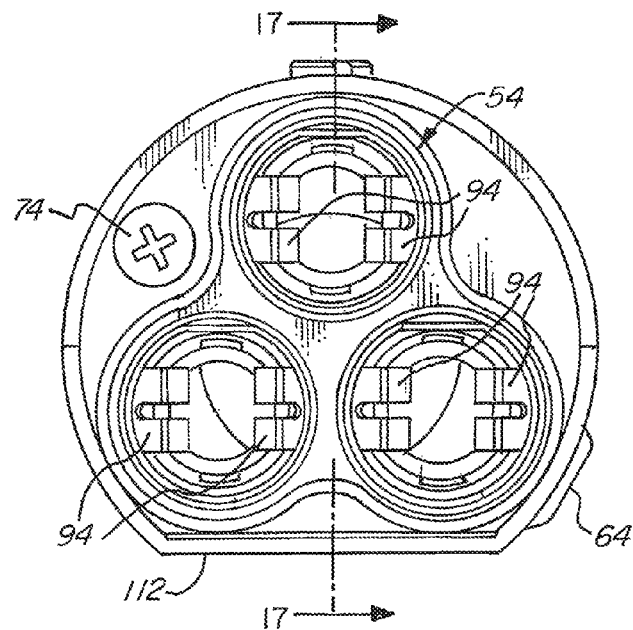
FIG. 16 is a front view of the electrical transition fitting as shown in FIG. 1.

As seen in the figures, including FIGS. 1 and 10, first member 56 of the lower body member 52 includes a hub or boss 98 with a threaded bore formed therein configured for receipt of a threaded fastener 102. As seen in FIG. 15, when an electrical conduit 104 is inserted into first member 56, it can be secured and electrically bonded thereto by tightening fastener 102 so as to make mechanical and electrical contact with the outer surface of the electrical metallic tubing 104.

Figure 17:
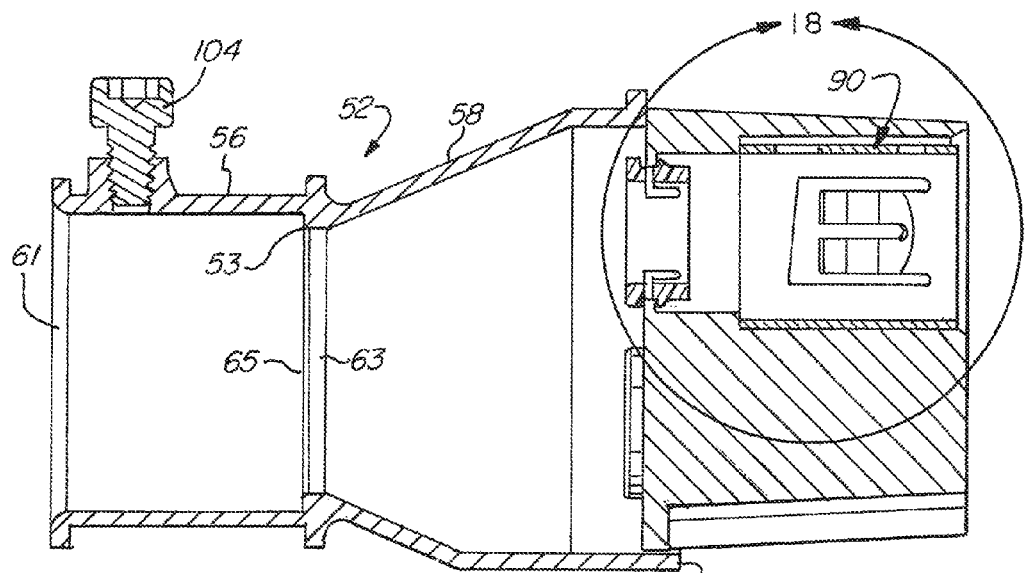
FIG. 17 is a cross-sectional side view of the electrical transition fitting taken along line 17-17 as shown in FIG. 16.
Figure 18:
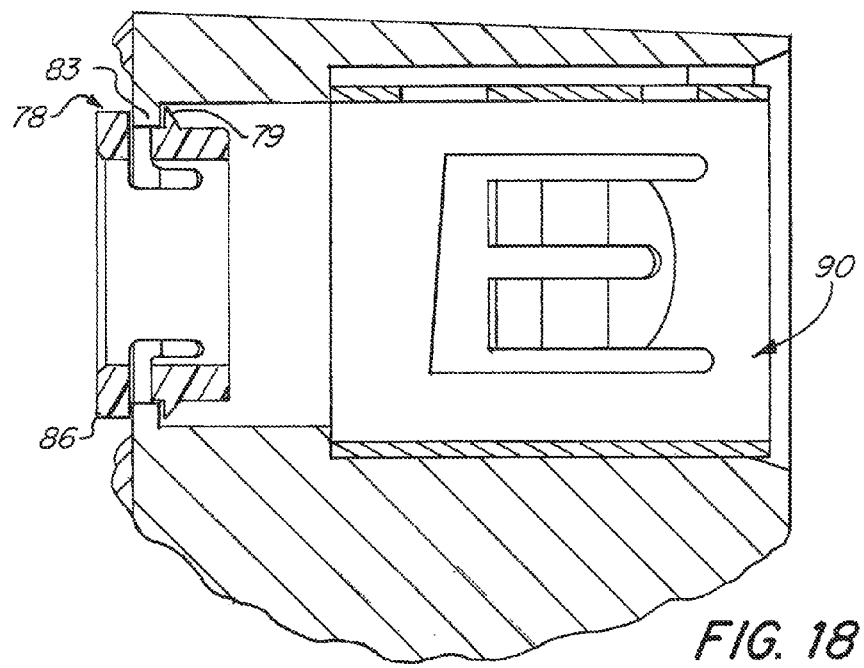
FIG. 18 is an enlarged cross-sectional view of the electrical transition fitting taken along line 18 as shown in FIG. 17.

As best seen in FIGS. 2, 6, 7, 10 and 20, the second member 58 of lower body member 52 preferably includes a region 112 that defines a flat surface so as to facilitate placement of the electrical transition fitting 50 along a flat surface 114 associated with a wall, ceiling, floor or the like. In this manner, the placement of the electrical transition fitting is facilitated in conjunction with such a surface. As seen in FIG. 17, second member 57 is integrally connected to an open end 65 of first member 56 at a first open end 63 of second member 58. The second member has an open second end 68 with a perimeter greater than a perimeter of first open end 63. The second member as seen in FIG. 1 can have a generally frustoconical shape.

Figure 20:
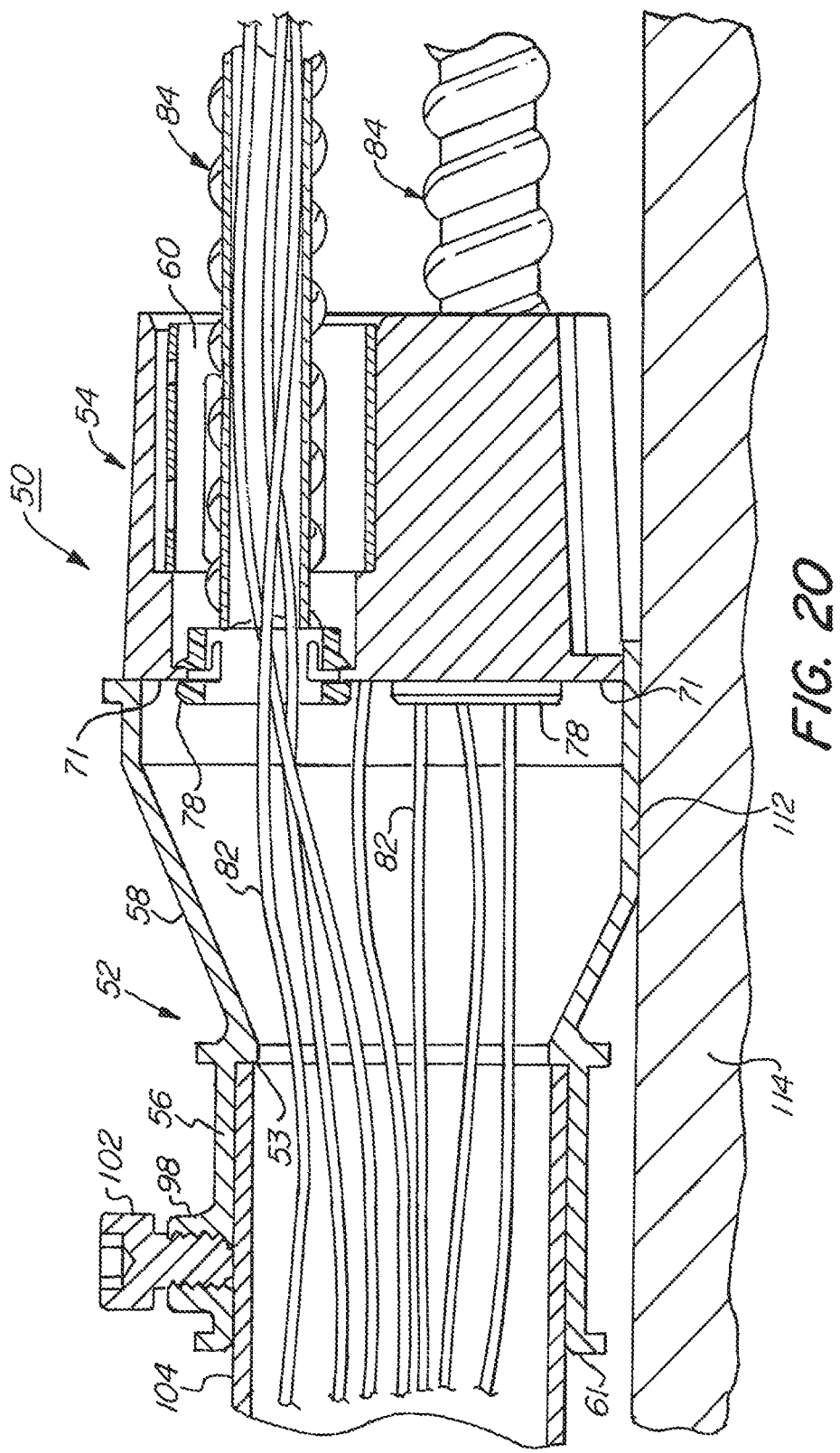
FIG. 20 is a side view of the electrical transition fitting where a flat base of the lower body member is positioned adjacent a flat surface, such as a wall or the like and showing in cross-section the electrical wires in multiple metal clad or armored clad cables passing through the transition fitting.

Furthermore, as seen in FIGS. 17 and 20, first member 56 of the lower body member 52 includes an inner rim 53 at second end 65 which acts as a stop for an electrical conduit 104 as it is inserted into the first member 56. FIG. 20 also shows fastener 102 making mechanical and electrical bonding connection to the electrical conduit 104.

Figure 21:
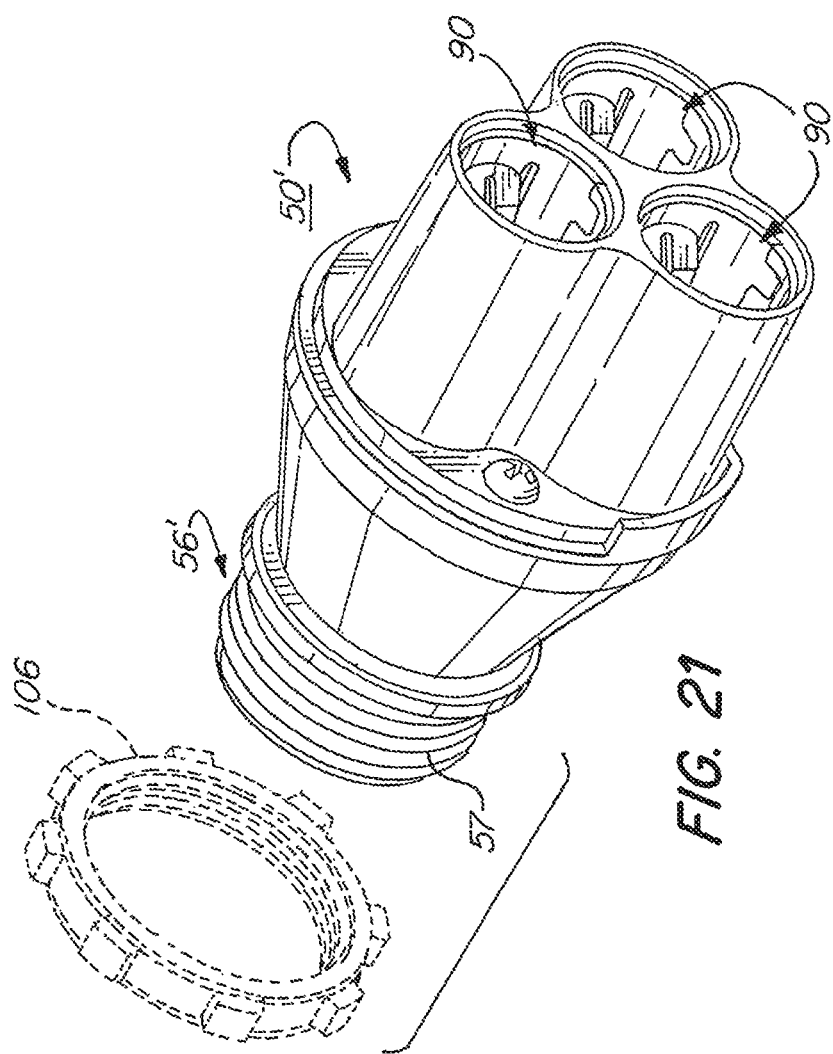
Figure 22:
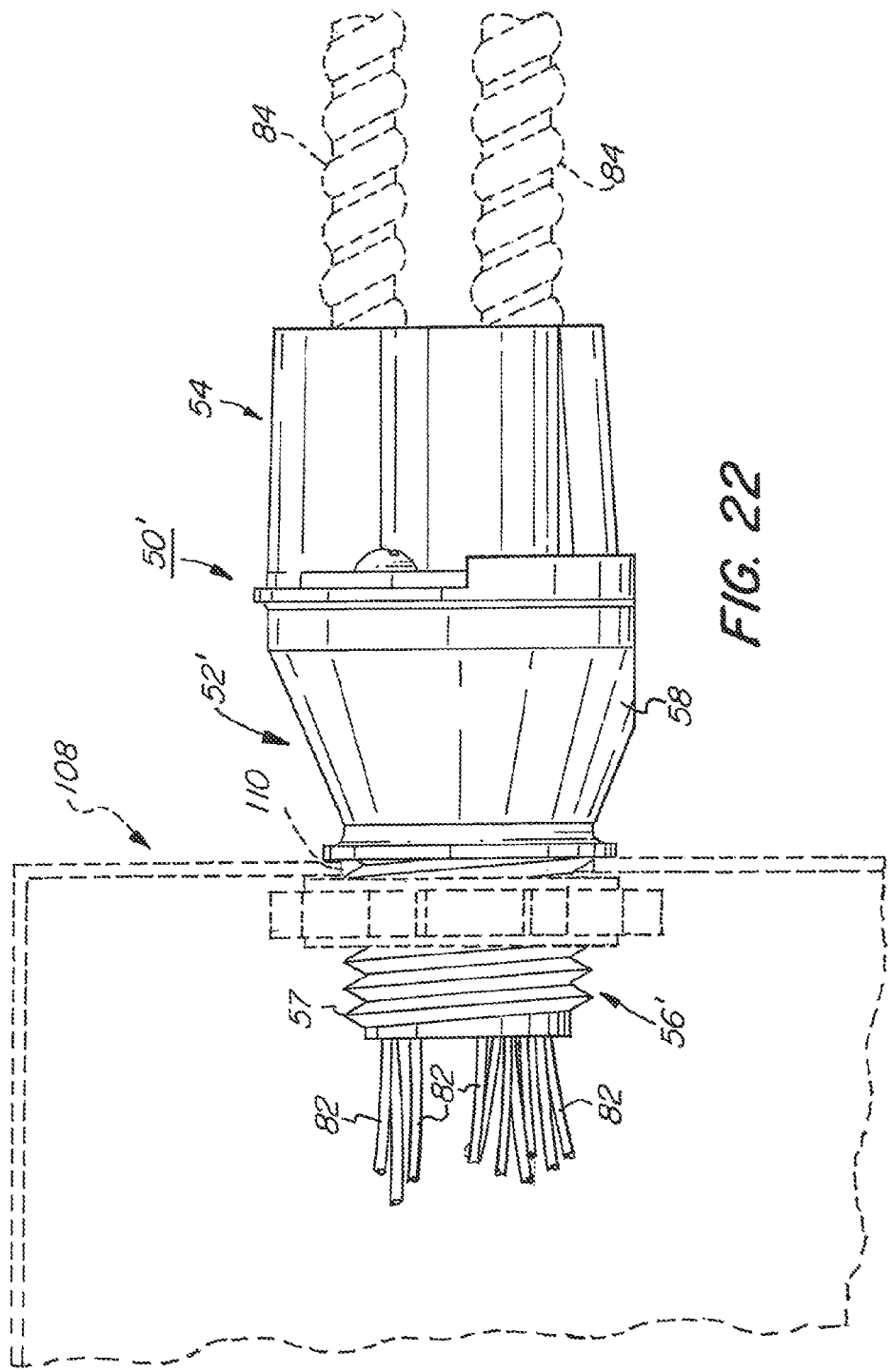
FIG. 22 is a side view of the electrical transition fitting as shown in FIG. 21, illustrating the electrical fitting connected to a panel box via a knockout hole therein.
Figure 23:
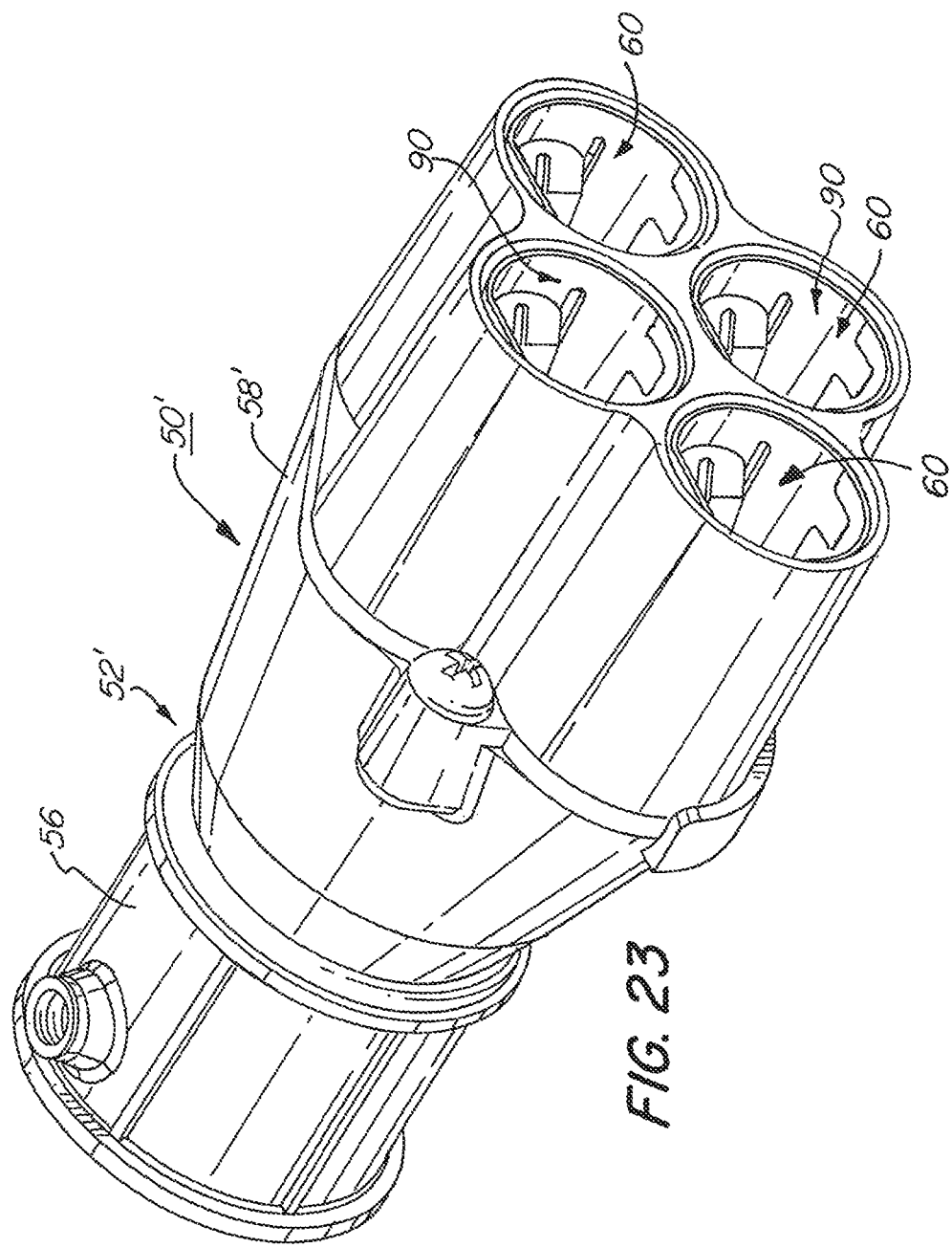
FIG. 23 is a perspective view of another embodiment of an electrical transition fitting, similar to FIG. 1, but having four bores.

As seen in FIGS. 21 and 22, an alternative embodiment of the electrical transition fitting has a lower body member 52 where in first member 56' thereof has exterior threads 57 which are dimensioned for mating with a locknut 106 so as to secure the electrical transition fitting to an electrical panel box or the like 108 by passing the first member of the lower body member through a knockout hole 110 in the panel box or the like. This alternative embodiment allows the desirable properties of the electrical transition fitting to be used in conjunction with a plurality of metal clad or armored clad cables that are combined and to allow the electrical wires thereof to pass into the panel box or the like.

Furthermore, FIGS. 1-22 are directed to embodiments of the electrical transition fitting where the upper body member has three bores 60. Alternative embodiments may have four or more bores 60, such as shown in FIGS. 23-27. Thus, for the three bore embodiment, the bores can be represented by the integer N where N=3 and for the four bore embodiment, N=4. Larger numbers of bores may also be envisioned, although practically it is believed that N=3, 4 or 5 would generally be the more practical embodiments for combining multiple metal clad or armored clad cables to a single electrical conduit or to an electrical panel box.

Figure 24:
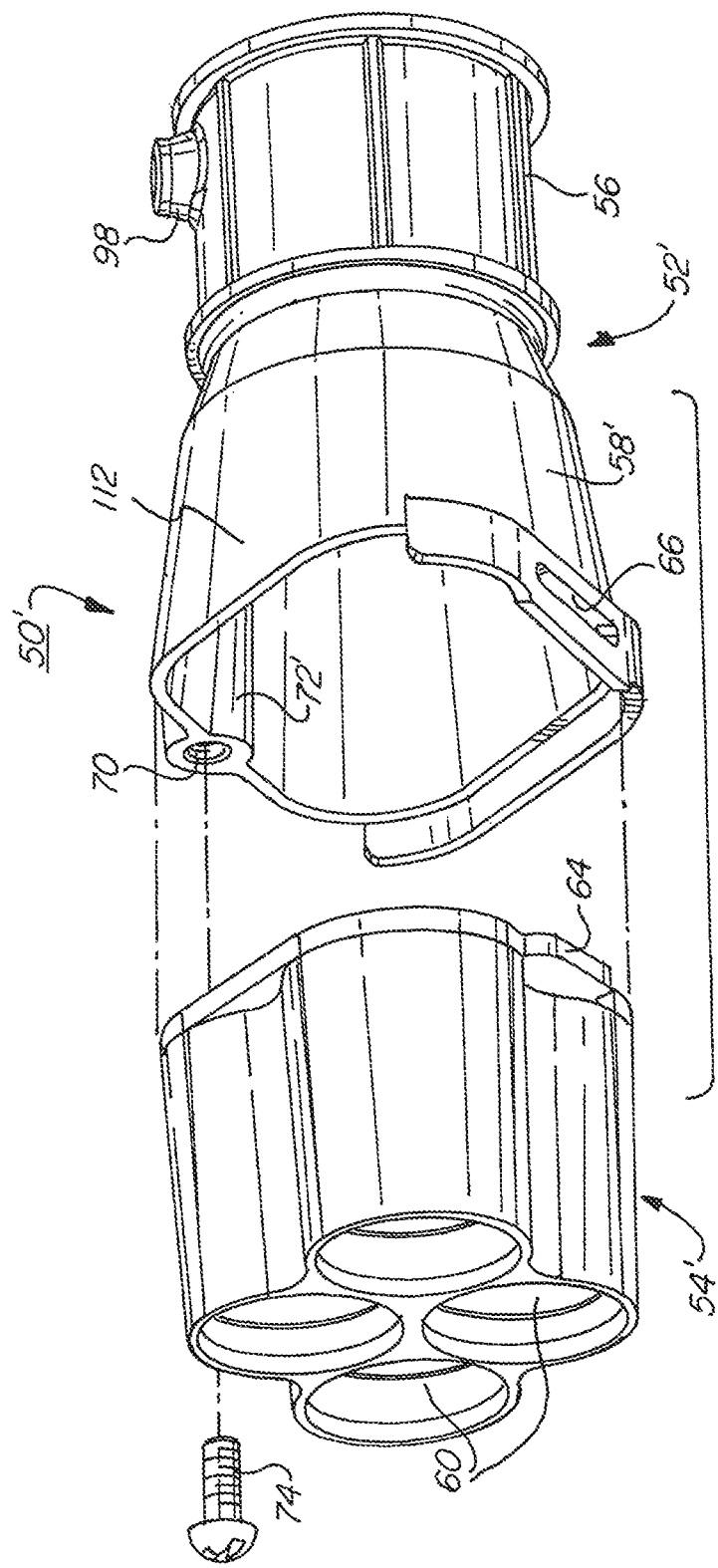
FIG. 24 is an exploded perspective view of the electrical transition fitting shown in FIG. 23 without the plastic insulators and inner locking devices installed.

As seen in FIGS. 23-27, an alternative embodiment of the electrical transition fitting 50' has four bores 60' for receipt of four MC/AC cables 84. The overall configuration of this transition fitting is essentially the same as that shown in the three bore configuration of FIGS. 1-22 and similar elements are shown with the same reference numerals. It is noted that the second member 58' of the lower body member 52' has a generally four-sided configuration with a region 112' as shown in FIG. 24 which can act as a flat surface for positioning the electrical transition fitting against a flat surface of a wall or the like.

Figure 25:
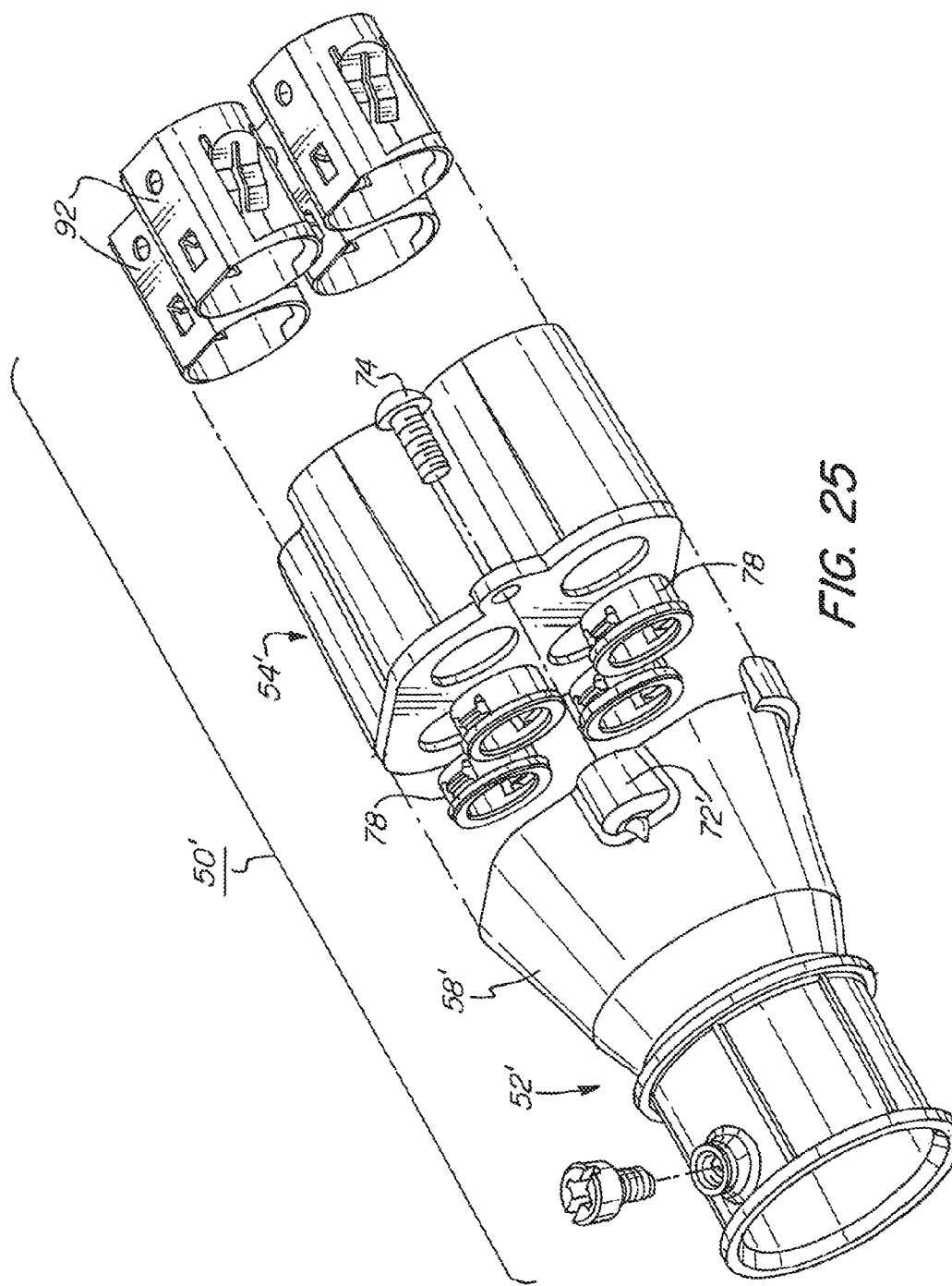
FIG. 25 is an exploded perspective view of the electrical transition fitting shown in FIG. 23, including illustration of the plastic insulators and inner locking devices.
Figure 26:
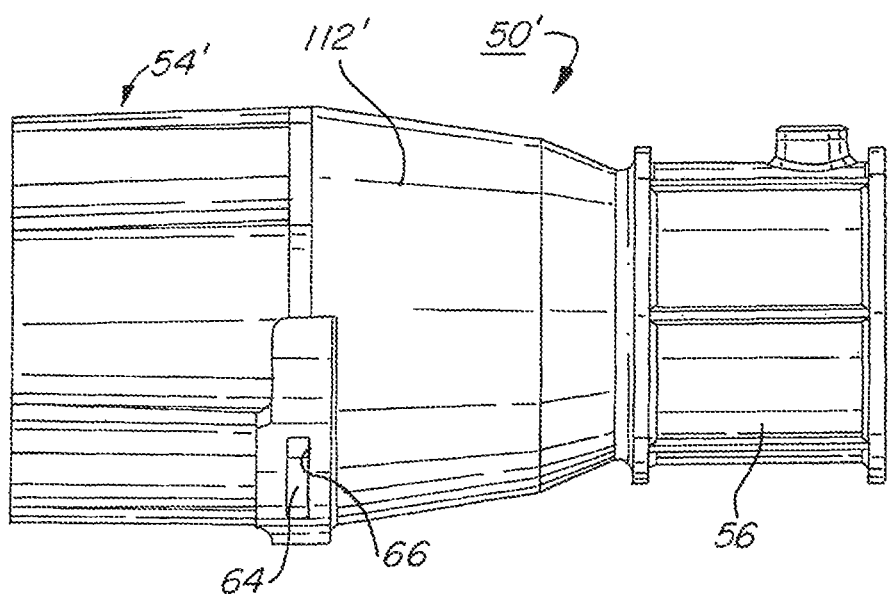
FIG. 26 is a side view of the electrical transition fitting shown in FIG. 23.

As also seen in this embodiment and as illustrated in FIG. 25, the upper body member 54 is secured to the lower body member 52 by fasteners 74 into threaded hole 70. However, the boss 72' in which the threaded hole is formed is positioned on an outside surface of the second member 58' of the lower body member 52'.

Figure 27:
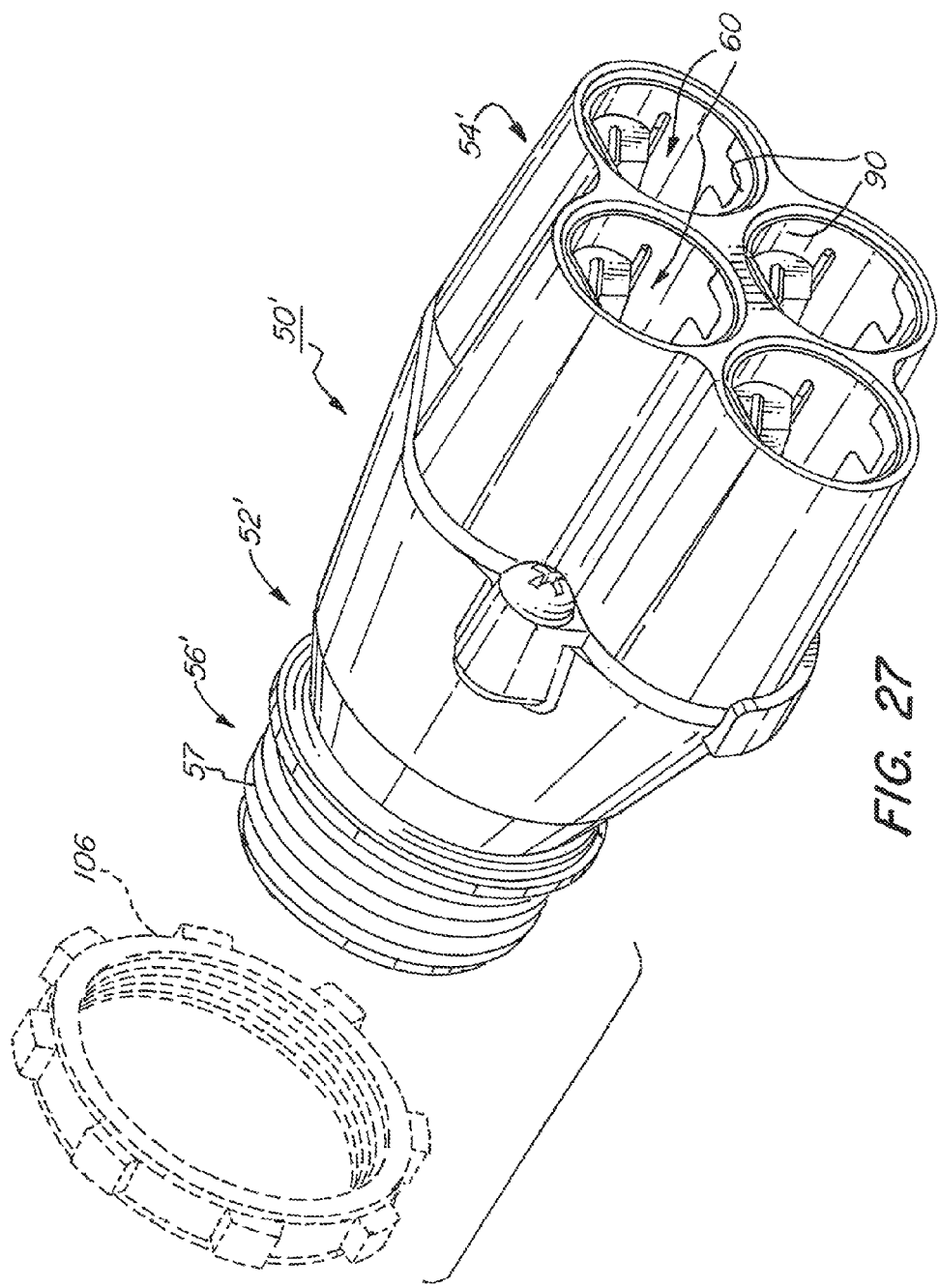

FIG. 27 shows an alternative embodiment of this four bore configuration which has threads 57 formed on the first member 56' so as to mate with locknut 106.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An electrical transition fitting for enabling electrical wires contained in N metal clad or armored clad cables to be combined and extended through an electrical conduit or into an electrical panel box, comprising:
   a lower body member having:
      a first member with an open first end dimensioned for receipt of an electrical conduit or for passage through a knockout hole in a panel box or the like, and
      a second member integrally connected at a first open end to an open second end of the first member, said second member having an open second end with a perimeter greater than a perimeter of the first open end of the second member, the open second end also having at least one slot formed therein;

an upper body member having an extended region with N bores formed therein, the bores for receipt of a metal clad or armored clad cable, the upper body member having a plate at a first end, the plate dimensioned for contact with the perimeter of the second open end of the second member of the lower body member, the plate having openings formed therein at least in partial alignment with the bores, the plate including a hole formed therein, the hole for receipt of a fastener so as to secure and electrically bond the upper body member to the open second end of the lower body member, the plate also having at least one tab dimensioned for receipt in the at least one slot of the second end of the second member;

N plastic insulators each dimensioned for snap in installation in one of the N bores at the first end of the upper body member; and N inner locking devices each dimensioned for press-in installation in one of the N bores at a second end of the upper body member and further configured to capture a metal clad or armored clad cable;

where N is an integer greater than two.

2. The electrical transition fitting according to claim 1, wherein the second member of the lower body member has a region that forms a flat surface so as to facilitate installation of the electrical transition fitting adjacent a flat surface.

3. The electrical transition fitting according to claim 2, wherein the at least one slot is formed in a rim segment on the second end of the second member of the lower body member.

4. The electrical transition fitting according to claim 1, wherein the at least one slot is formed in a rim segment on the second end of the second member of the lower body member.

5. The electrical transition fitting according to claim 1, wherein the first member of the lower body member includes a threaded bore passing therethrough dimensioned for receipt of a fastener so as to secure an electrical conduit to said first member.

6. The electrical transition fitting according to claim 5, wherein the first member of the lower body member has an inner rim that acts as a stop to an electrical conduit positioned within the first member.

7. The electrical transition fitting according to claim 1, wherein each inner locking device comprises a pair of arms extending inwardly from an inner surface of the inner locking device, the arms configured to secure and electrically bond to an outer surface of a metal clad or armored clad cable.

8. The electrical transition fitting according to claim 1, wherein the second member of the lower body member has a generally frustoconical shape.

9. The electrical transition fitting according to claim 8, wherein N=3.

10. The electrical transition fitting according to claim 9, wherein the second member of the lower body member has a region that forms a flat surface so as to facilitate installation of the electrical transition fitting adjacent a flat surface.

11. The electrical transition fitting according to claim 1, wherein the plate of the upper body member has N openings with inwardly extending rims each rim positioned about one of the N bores and wherein each plastic insulator has a radially extending rim at one end and radially projecting flexible fingers so as to capture the insulator between said radially extending rim, one of the N inwardly extending rims, and said radially projecting fingers.

12. The electrical transition fitting according to claim 1, wherein the first member of the lower body member includes threads positioned on the outer surface thereof to secure installation of the electrical transition fitting through a knockout hole of an electrical panel box or the like by securement of a locknut thereto.

13. The electrical transition fitting according to claim 1, wherein each of the N plastic insulators has an inner end that acts as a stop to a metal clad or armored clad cable when inserted into a bore of the electrical transition fitting.

14. The electrical transition fitting according to claim 1, wherein the first member of the lower body member has an inner rim that acts as a stop to an electrical conduit positioned within the first member.

* * * * *